Nov. 6, 1928.

W. McM. HEPBURN 1,690,819

REGULATING APPARATUS

Filed May 29, 1924    2 Sheets-Sheet 1

Williams M. Hepburn INVENTOR

BY

Edmund G. Borden ATTORNEY

Nov. 6, 1928.
W. McM. HEPBURN
1,690,819
REGULATING APPARATUS
Filed May 29, 1924    2 Sheets-Sheet 2
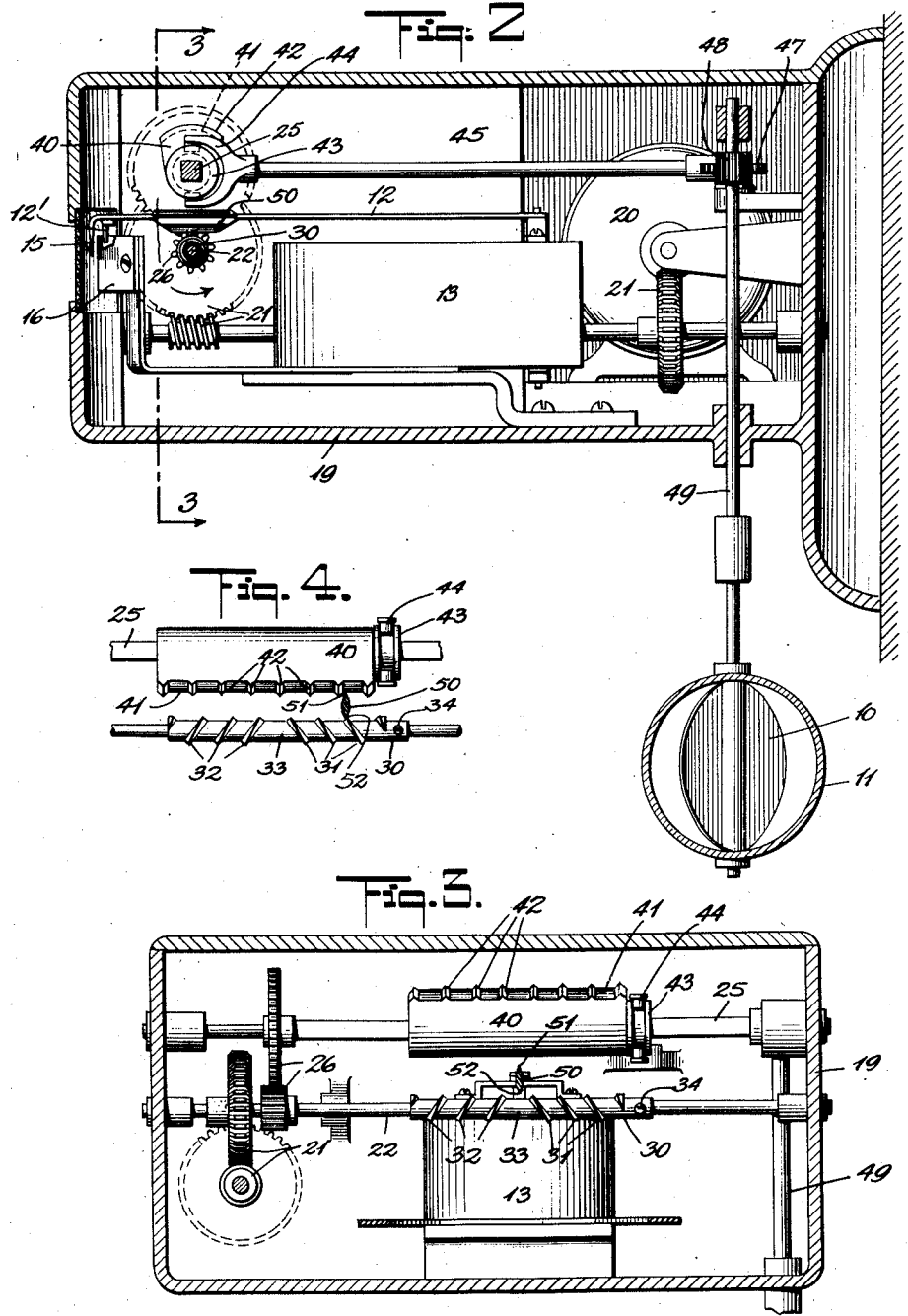

Patented Nov. 6, 1928.

1,690,819

UNITED STATES PATENT OFFICE.

WILLIAM McMEEN HEPBURN, OF NEW YORK, N. Y., ASSIGNOR TO THE SURFACE COMBUSTION CO. INCORPORATED, OF NEW YORK, N. Y., A CORPORATION OF NEW YORK.

REGULATING APPARATUS.

Application filed May 29, 1924. Serial No. 716,619.

This invention relates to regulating apparatus, and aims to provide means for utilizing the position of a member which may be moved by a very slight force to control the position of a member which may present substantial resistance to movement. The invention is of especial value when used as a part of governing mechanism, that is to say, mechanism designed to maintain a desired condition.

Regulating apparatus actuated by a needle to cause movements of a valve or damper has heretofore been used in thermostatic and other governing mechanism. In such mechanism, however, the operation of the regulating apparatus has been either to cause a continuous movement of the damper during such time as the needle remains in a predetermined position or to cause a movement of predetermined extent whenever the needle reaches a predetermined position. In the usual arrangement of such regulating apparatus, the damper is moved only when the needle reaches one end of a predetermined range, movements of the needle within this range having no effect on the regulating apparatus. Regulating apparatus so arranged is not well adapted to maintain a desired temperature or other condition, since to enable the apparatus to operate as part of a governing mechanism, the movements of the valve or damper which occur when the needle reaches either end of the range is usually sufficient to cause a change in conditions which will move the needle to the other end of its range. The movements of the valve or damper are therefore greater than is necessary to cause a return to the desired condition. The result of this irregular control is to maintain an oscillating condition instead of the substantially uniform condition desired. These disadvantages are overcome by the present invention.

Regulating apparatus constructed in accordance with the present invention operates to cause movements of the controlled member at brief intervals, and provides that the extent of each movement be proportional to the displacement of the needle from a given point at the moment of the movement, and that the direction of each movement corresponds to the direction of the displacement of the needle from the given point at the moment of the movement. When used as a part of governing mechanism the apparatus thus causes frequent adjustments, each of the extent required to restore conditions to the desired condition. The regulating mechanism therefore serves to maintain a desired substantially uniform condition.

Regulating apparatus embodying the invention comprises in combination with a needle and a member to be controlled, means for engaging the needle at intervals, and means actuated, either directly or indirectly, by each such engagement to cause a movement of the controlled member proportional in extent and corresponding in direction to the extent and the direction of the displacement of the needle from a given point at the moment of that engagement.

Regulating apparatus embodying the invention may be used to control the position of various mechanical devices in accordance with the position of a needle moved by any slight force. It may be used as a part of thermostatic mechanism, as a part of mechanism to govern the amperage or voltage of electric currents, to control the steering mechanism of a vessel in accordance with the position of a compass needle, and for many other purposes. For the sake of illustration, I will describe the use of a specific mechanical regulating apparatus embodying the invention and arranged to position a damper in accordance with the position of the needle of a galvanometer. Such an embodiment of the invention is illustrated in the accompanying drawings; in which Fig. 1 is a top view of the regulating apparatus and parts associated therewith, the cover of the casing in which the apparatus is contained being removed;

Fig. 2 is a side elevation of the apparatus shown in Fig. 1 sectioned on the line 2—2 of Fig. 1;

Fig. 3 is a front elevation of the apparatus sectioned on the line 3—3 of Fig. 2; and Fig. 4 is a fragmentary section on the line 3—3 of Fig. 2 showing parts of the regulating apparatus in a position different from that shown in Fig. 3.

Figure 1:
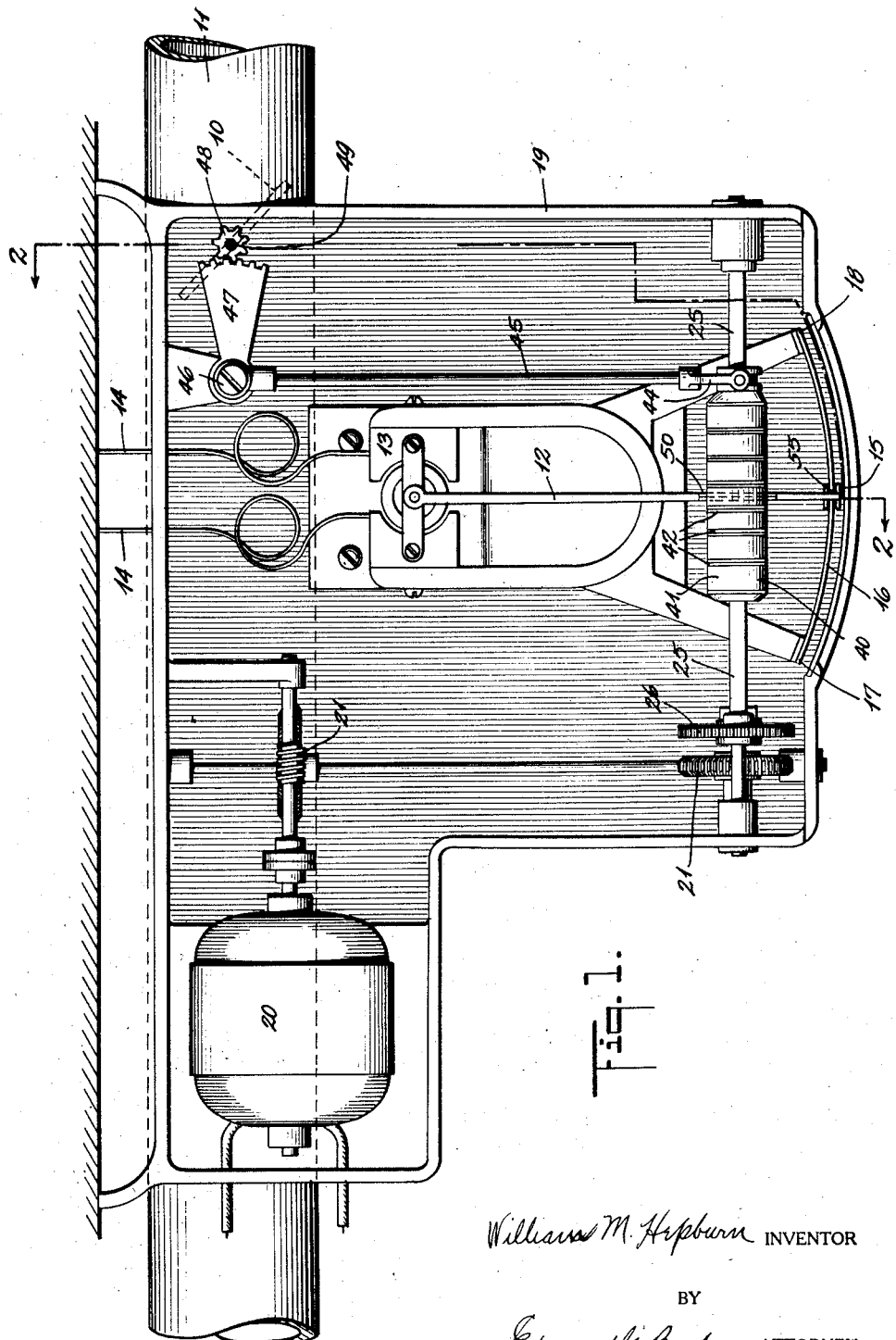

The regulating apparatus shown in the drawings serves to control the position of a damper 10 in a pipe 11 in accordance with the position of the needle 12 of a galvanometer 13. So far as the operation of the regulating apparatus is concerned, it is not essential that the position of the damper 10, have any effect upon the conditions which determine the position of the needle 12. The regulating apparatus, however, produces its greatest advantages when such a connection exists so that the regulating apparatus may form part of governing mechanism.

In order to explain a specific use of the regulating apparatus, it may be assumed that the leads 14 of the galvanometer 13 are connected to a thermocouple, which is subjected to heat produced in a furnace supplied with air through the pipe 11, so that an increase in the furnace heat, caused by an opening of the damper 10, moves the needle 12 in one direction, while a closing of the damper 10 causes a reduction in heat which moves the needle 12 in the opposite direction. A pointer 15 at the end of the needle may cooperate with a scale 16 to indicate the temperature attained in the furnace, and the needle may be moved toward the end 17 of the scale by an increase in temperature and toward the end 18 of the scale by a decrease in temperature. Under these circumstances, the regulating apparatus will operate to control the position of the damper 10 in a manner to maintain any desired temperature in the furnace.

The regulating apparatus illustrated is located in a casing 19. The apparatus includes a driving motor 20, which is preferably, although not necessarily, operated at a uniform speed. A constant speed electric motor is satisfactory for the purpose. The shaft of the motor 20 is connected through reducing gearing 21 to a shaft 22 which extends under the needle 12 of the galvanometer near the outer end of the needle. The shaft 22 thus extends adjacent to the path of the normal movement of the needle and in the general direction of such movement. The direction of rotation of the shaft 22 is indicated by an arrow in Fig. 2. A shaft 25 extends parallel to the shaft 22 and above the needle 12. This shaft is driven by the motor 20 at a much slower speed than the shaft 22. For this purpose, the shaft 25 may be connected to the shaft 22 through reducing gearing 26.

A worm gear 30 is mounted on the shaft 22. The worm gear 30 has a right-hand raised thread 31 and a left-hand raised thread 32 and a central space 33 between these threads. The worm gear is adjustably secured on the shaft 22, for example, by means of a set screw 34.

The shaft 25 carries a cam 40 which is mounted on it in such manner that the cam may slide longitudinally on the shaft but cannot turn with respect to the shaft. This result may be obtained, as illustrated, by making the shaft 25 square and providing a square hole in the cam 40. The cam 40 has a projection whose outer surface 41 is a sector of a cylinder coaxial with the shaft 25. On the surface 41 are spaced circumferential ridges 42. The width of the cylindrical surface 41 is so proportioned to the pitch of the threads 31 and 32 of the worm 30 and to the relative speed of rotation of the shafts 22 and 25 that an element engaging one of the threads 31 or 32 at its outer end will be moved to the inner end of this thread during the time in which the shaft 25 turns through an angle equal to the arcuate width of the surface 41.

The cam 40 is connected with the damper 10 in such manner that a sliding of the cam toward the end of the shaft 25 nearest to the end 17 of the scale 16 causes an opening movement of the damper, while a sliding movement of the cam in the opposite direction causes a closing movement of the damper. The mechanism illustrated for this purpose includes a grooved collar 43 secured to the cam 40. A fork 44 engaging the groove in this collar is mounted on a rod 45 which is pivoted at 46 and carries a laterally extending gear segment 47 which meshes with a pinion 48 fixed on the shaft 49 on which the damper 10 is mounted. It should be noted that, as the length of the rod 45 is great compared with the movements of the cam 40, the movements of the damper are approximately proportional in amount to the sliding movements of the cam.

The portion 50 of the needle 12 which lies between the shafts 22 and 25 may be of greater cross-section than the rest of the needle and is provided with a sharp upper edge 51 and a sharp lower edge 52. On each revolution of the shaft 25 the surface 41 of the cam 40 engages the upper edge 51 of the portion 50 of the needle and depresses the needle. In order to prevent this engagement from causing undue strain on the pivot on which the needle is mounted, the needle 12 is provided with a stop 12' which engages the back of the scale 16 when the needle is engaged by the surface 41 and thus prevents any material longitudinal movement of the needle during the time that the surface 41 is rubbing across the edge 51.

The operation of the regulating apparatus described, when used as part of a mechanism such as referred to for governing furnace temperatures, is as follows:

To adapt the apparatus for maintaining a given temperature, the needle 12 is held at the point of the scale 16 which indicates the desired temperature, and the position of the worm 30 on the shaft 22 is then adjusted to bring the central space 33 under the needle. In the arrangement illustrated in the drawings, the worm 30 is adjusted to maintain the temperature indicated by the needle when the needle is at the central point 55 of the scale 16.

After the adjustment of the position of the worm 30, the motor 20 is operated continuously, preferably at a substantially uniform speed, so that the shafts 22 and 25 are rotated continuously, but at different speeds. During the operation of the device, the portion 50 of the needle 12 normally lies clear of the threads of the worm 30 (as shown in Fig. 3), so that the needle is free to assume the position into which it is urged by the coil of the galvanometer 13. At regular intervals, that is to say, on each revolution of the shaft 25, the cylindrical surface 41 of the cam 40 comes into contact with the portion 50 of the needle and depresses this portion of the needle slightly out of its normal path of travel. If the needle is at the given point 55, as shown in Fig. 3, it is depressed into the space 33 between the threads 31 and 32, so that neither of the threads comes into contact with it. If, however, the needle happens to be displaced from the given point 55 when it is pressed down by the cylindrical surface 41 of the cam, the portion 50 of the needle is brought between two turns of one of the raised threads 31 or 32. The portion 50 of the needle is then engaged by this thread,— for example, by the thread 31 as shown in Fig. 4,—and the rapid rotation of the shaft 22 causes this thread to move the needle back to the central space 33, that is to say, to the given point 55, during the time that the needle is depressed by the cylindrical surface 41 of the cam 40. The length of time during which one or the other of the threads 31 or 32 is in contact with the needle on each revolution of the shaft 25 is, therefore, proportional to the extent to which the needle is displaced from the given point 55 when it is depressed by the front edge of the surface 41 and engaged by the thread. The movement imparted to the needle by one of the threads brings the needle into engagement with one of the ridges 42 of the cam 40, as shown in Fig. 4, and slides the cam along the shaft 25 a distance substantially equal to the extent to which the needle was displaced from the given point 55 when the surface 41 came into contact with it. Through the rod 45 and the mechanism associated with it, such movement of the cam 40 causes a corresponding movement of the damper 10. If, at the time that the needle is engaged by the cylindrical surface 41, the needle is displaced from the given point 55 toward the end 17 of the scale, indicating that a temperature in excess of the desired temperature exists in the furnace, the needle and the cam 40 are moved to the right by the thread 32, closing the damper 10 to an extent proportional to the amount of displacement of the needle. Conversely, if at the time of the engagement, the needle is displaced from the given point 55 toward the end 18 of the scale, indicating that the temperature in the furnace is below the desired temperature, the needle and the cam 40 are moved to the left by the thread 31, opening the damper 10 to an extent proportional to the displacement of the needle.

The entire mechanism thus constitutes a governor reducing the supply of air to the furnace when the temperature of the furnace exceeds a desired temperature and increasing the supply of air to the furnace when the temperature of the furnace falls below this temperature. The adjustments are made at frequent and regular intervals and the movement of the damper at each adjustment is proportional to the difference between the actual temperature and the desired temperature at the time of adjustment. It is therefore possible to provide that the change in the position of the damper on each adjustment shall cause the change in air-supply necessary to bring the actual furnace temperature back to the desired furnace temperature. Governing mechanism provided with regulating apparatus embodying my invention is, therefore, capable of maintaining a substantially constant temperature.

The utility of regulating apparatus embodying the invention is by no means limited to the specific use of such mechanism which has been described. Since, so far as the operation of the regulating apparatus is concerned, the manner in which the needle is moved and the function of the controlled member are immaterial, it is apparent from the description which has been given that the regulating apparatus may be incorporated in governing mechanism for maintaining uniform conditions of all sorts, such as uniform conditions of the flow of an electric current or of the voltage of an electric current, or uniform position of apparatus of any sort. Furthermore, the regulating apparatus need not be a part of a governing mechanism but may be used to control the position of any member in accordance with movements of a needle whose position is not affected by that of the controlled member.

The invention is by no means limited to the particular mechanical apparatus embodying it which has been shown and described, but comprehends other constructions in which means are provided for engaging the needle at intervals and in which each engagement, either directly or indirectly, effects a movement of the controlled member proportional to the extent of the displacement of the needle at the time of the engagement. It is not essential that the movement of the controlled member be caused through a movement imparted to the needle by the engaging means.

It will be understood that the term "needle" as used herein is to be taken as a term of description and not of limitation, that is, as descriptive of an element which may be moved by a slight force and that the term "controlled member" or "member to be controlled" is to be taken as descriptive of a means which is to be moved or regulated in accordance with the displacement of the needle.

What is claimed is:

1. The combination with a needle and a member to be controlled in accordance with a change in position of the needle from a given neutral point, of means for temporarily returning the needle to said given position after a change from that position, and means actuated by said means for imparting movements to the controlled member proportional to the change of position of the needle from said given position.

2. The combination with a movable needle and a member to be controlled in accordance with the position of the needle, of a first means arranged to be engaged by the needle when the needle is at one side of a given position and on each such engagement to remain in contact with the needle for a time proportional to the extent of the displacement of the needle from said given position at the moment of that engagement, a second means arranged to be engaged by the needle when the needle is at the other side of said given position and on each such engagement to remain in contact with the needle for a time proportional to the extent of the displacement of the needle from said given position at the moment of that engagement, means for causing movement of the controlled member in one direction during the time that the first means is in contact with the needle and for causing movement of the controlled member in the opposite direction during the time that the second means is in contact with the needle, and means for causing the needle to engage the first or second means under the condition specified.

3. The combination with a needle and a member to be controlled in accordance with a change in position of the needle from a given neutral point, of means for temporarily returning the needle to its original position after a change from that position, and means for moving the controlled member during the period that the needle is being temporarily returned to its original position.

4. The combination with a movable needle and a member to be controlled in accordance with the position of the needle, of a rotary shaft extending adjacent to the path of movement of the needle, a worm on said shaft having a thread normally out of engagement with the needle, means for causing engagement between the needle and said thread at intervals and for periods of time sufficient to permit the thread to move the needle to the end of the thread on each engagement, and means actuated according to the movement so imparted to the needle to move the controlled member to a proportional extent.

5. The combination with a movable needle and a member to be controlled in accordance with the position of the needle, of a rotary shaft extending adjacent to the path of movement of the needle, a worm on said shaft having a thread normally out of engagement with the needle, means for causing engagement between the needle and said thread at intervals and for periods of time sufficient to permit the thread to move the needle to the end of the thread on each engagement, and means actuated directly by the movement so imparted to the needle to move the controlled member to a proportional extent.

6. The combination with a movable needle and a member to be controlled in accordance with the position of the needle, of a rotary shaft extending adjacent to the path of movement of the needle, a worm on said shaft having a thread normally out of engagement with the needle, and means which is arranged to hold the needle in engagement with the thread at intervals and for periods of time sufficient to permit the thread to move the needle to the end of the thread on each engagement, which engages the needle so that it is moved with the needle when the needle is moved by the thread, and which is connected with the controlled member so that its movements are transmitted to the controlled member.

7. The combination with a movable needle and a member to be controlled in accordance with the position of the needle, of a rotary shaft extending adjacent to the path of movement of the needle, a worm mounted on said shaft and normally out of engagement with the needle, a right-hand thread and a left-hand thread on said worm having their inner ends spaced apart, means for causing engagement between the needle and the worm at intervals and for periods of time sufficient to permit the thread which engages the needle to move the needle to the space between the two threads on each engagement, and means actuated according to the movement so imparted to the needle to move the controlled member to a proportional extent and in a corresponding direction.

8. The combination with a movable needle and a member to be controlled in accordance with the position of the needle, of a rotary shaft extending adjacent to the path of movement of the needle, a worm on said shaft and normally out of engagement with the needle, a right-hand thread and a left-hand thread on said worm having their inner ends spaced apart, and means which is arranged to hold the needle in engagement with the worm at intervals and for periods of time sufficient to permit the thread which engages the needle to move the needle to the space between the two threads on each engagement, which engages the needle so that it is moved with the needle when the needle is moved by one of the threads, and which is connected to the controlled member so that its movements are transmitted to the controlled member.

9. The combination with a needle and a member to be controlled thereby, of two rotary shafts extending adjacent to the path of movement of the needle and positioned so that the needle lies between them, means for rotating one of said shafts at a relatively high rate of speed and for rotating the other shaft at a relatively low rate of speed, a worm mounted on the rapidly rotated shaft and normally out of engagement with the needle, a right-hand thread and a left-hand thread on said worm having their inner ends spaced apart, a cam slidably mounted on the other of said shafts and adapted on each revolution of said shaft to engage the needle and move it into engagement with the worm and to hold it in engagement with the worm for a period sufficient to permit the thread which engages the needle to move it to the space between the two threads, circumferential ridges on the cam which are engaged by the needle when it is moved by one of the threads so that such movement of the needle slides the cam along its shaft, and a connection between the cam and the controlled member for causing movements of the controlled member proportional in extent and corresponding in direction to the sliding movements of the cam.

10. The combination with a movable needle and a member to be controlled in accordance with a change of position of the needle from a given neutral point, of means operative at regular intervals to move the needle laterally out of its normal path of movement, means arranged to engage the needle on such lateral movement thereof when the needle has moved from said point and to move it toward said point, and means actuated during the movement so imparted to the needle to move the controlled member to a proportional extent.

11. The combination with a movable needle and a member to be controlled in accordance with the position of the needle, of a rotary shaft extending adjacent to the path of movement of the needle, a worm mounted on said shaft and adjustable longitudinally thereof and having a thread normally out of engagement with the needle, means for causing engagement between the needle and said thread at intervals and for periods of time sufficient to permit the thread to move the needle to the end of the thread on each such engagement, and means actuated according to the movement so imparted to the needle to move the controlled member to a proportional extent.

12. The combination with a pivoted controlling needle and a member to be controlled in accordance with the position of the controlling needle, of a rotary shaft extending adjacent and parallel to a chord of the arc of movement of a part of the needle, a worm mounted on said shaft and normally out of engagement with the needle, a right-hand thread and a left-hand thread on said worm having their inner ends spaced apart, means for causing engagement between the needle and the worm at intervals and for periods of time sufficient to permit the thread which engages the needle to move the needle to the space between the two threads on each engagement, and means actuated according to the movement so imparted to the needle to move the controlled member to a proportional extent and in a corresponding direction.

13. In combination with a movable indicating needle, a pair of continuously rotatable members between which the needle is movable, means on one of said members adapted when the needle is in engagement therewith to return the needle to its neutral position after a change from that position, means on the other of said members for temporarily, at regular time intervals, holding the needle in operative engagement with said means, a device to be actuated proportionately to the deflection of the needle from said neutral point, and means operatively coupling said device to the needle during its return to said neutral position.

In testimony whereof I affix my signature.

WILLIAM McMEEN HEPBURN.